Figure 1:
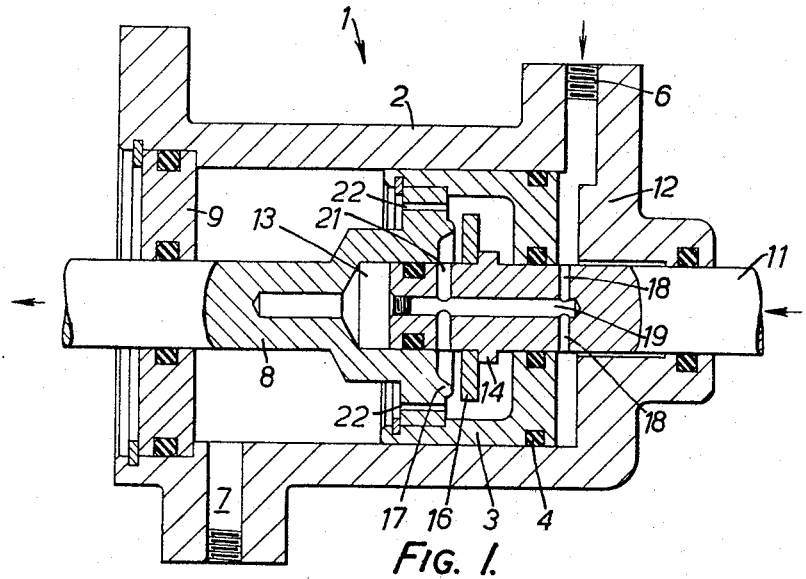

June 27, 1967  B. A. JOHNSON  3,327,590

SERVO MOTOR MECHANISM

Filed Nov. 2, 1965

United States Patent Office 3,327,590
Patented June 27, 1967

3,327,590
SERVO MOTOR MECHANISM
Brian Alan Johnson, Tyseley, Birmingham, England, assignor to Girling Limited
Filed Nov. 2, 1965, Ser. No. 506,107
Claims priority, application Great Britain, Nov. 4, 1964, 45,039/64
3 Claims. (Cl. 91—49)

This invention relates to hydraulic servo motor mechanisms and to hydraulic servo systems incorporating such valves.

Hydraulic servo motor mechanisms have been proposed in which the output of the servo mechanism is subject to fluctuations in the fluid supply affecting the base pressure. This problem is particularly acute in the case of a servo mechanism in a hydraulic servo system which is providing fluid pressure to two or more systems. For example, the servo mechanism may control a vehicle braking system by providing an output to an actuating means such as a master cylinder, and take its supply of pressurised fluid from a pump which also serves a second hydraulic servo system such as a steering servo system, so that the supply pressure will be subject to fluctuation due to the intermittent demands of the steering system. Even if there is no second servo system, the supply pressure may vary due to irregular operation of the pump.

The present invention provides a servo mechanism which can overcome the above described difficulty, the valve comprising a cylinder, a piston reciprocable in the cylinder, the cylinder having a fluid inlet and a fluid outlet, one on either side of the piston, passage means to direct hydraulic fluid from the inlet through the piston, a control valve member and a co-operating valve seat to control the flow of hydraulic fluid through the passage means, and an input member connected to the valve member for moving the valve member towards the seat, wherein the passage means is arranged to transmit the fluid pressure in the inlet to one side of the valve member in a sense to move the valve member away from the seat in opposition to closing movement of the valve member.

With this arrangement it becomes possible to arrange that the piston is balanced when the valve member is in its open position, so that no output force is applied to the output member until the valve member is moved towards its co-operating seat in order to introduce a pressure difference across the piston, the pressure difference being independent of the initial inlet pressure at the time the valve member is actuated. Additionally, the increased pressure produced by closing movement of the valve member acts on the mechanism in opposition to closing movement, thereby providing "feel" at the input member.

In the preferred embodiment of the invention, the mechanism is constituted by a face valve which is mounted on the input member and is arranged to transmit forces between an abutment on the input member and another abutment, constituted by the valve seat, on the output member, to permit actuation of output member in the event of failure of the hydraulic supply. This arrangement permits of a very simple and reliable construction of servo-mechanism.

The invention also includes a hydraulic servo arrangement comprising a valve in accordance with the invention, a supply of hydraulic fluid under pressure connected to the valve inlet, a first hydraulic servo-system including an actuating means operated by the said output member, and a second hydraulic servo-system connected to the output of the servo-valve to receive fluid from the supply via the servo-valve, the said second servo-system having independent actuating means, the arrangement being such that fluctuations in the supply due to operation of the said second system do not substantially affect operation of the said first system.

Figure 2:
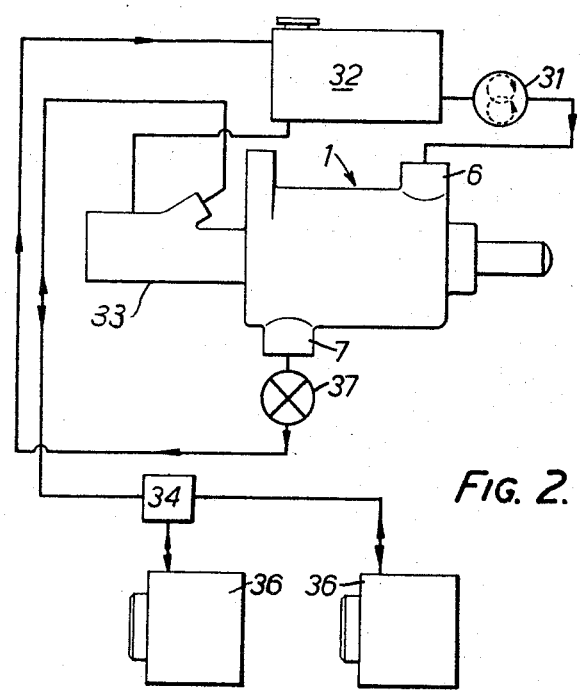

A preferred form of servo-mechanism and of servo-system in accordance with the invention will now be described, by way of example, with reference to the accompanying drawings, in which:

FIGURE 1 is a cross-sectional elevation of the servo-mechanism; and
FIGURE 2 is a diagrammatic view of the servo-system incorporating the mechanism.

The servo-mechanism 1 comprises a body in the form of a cylinder 2, within which there is a reciprocable piston 3 having a circumferential seal 4 engaging the inside of the cylinder. The cylinder 2 has a fluid inlet 6 and an outlet 7, one on either side of the piston 3. Secured to the piston on the output (or left hand) side thereof is an output member 8 in the form of a push rod which extends in slidable, sealed relation to the adjacent end wall 9 of the cylinder. An input member 11 in the form of an input push rod extends in sliding sealed engagement through opposite end wall 12 of the cylinder 2 and through the piston 3. The input member also extends, through a sliding seal, into a bore 13 in the output member 8. The input member 11 is provided with an abutment in the form of a collar 14 which engages a control valve member constituted by a face valve 16 arranged to co-operate with a valve seat 17 formed at the adjacent end of the output member 8.

The input member 11 is formed with radial bores 18 permanently in communication with the inlet 6 and leading to an axial bore 19, in turn communicating with further radial bores 21 which open inside the valve seat 17. Bores 22 are formed through the adjacent end of the output member 8, and it will be seen that the bores 18, 19, 21 and 22 constitute passage means to direct fluid from the inlet 6 through the piston 3 to the outlet 7, the passage means leading fluid from the inlet through the valve seat 17, past the face valve 16 and then to the outlet, and that the face valve 16 is adapted to control the flow of fluid through the passage means. The effective opposed areas of the piston 3, the output member 8, the input member 11 and the face valve 16 are so proportioned that, with the face valve fully open (as shown) there is no resultant hydraulic pressure acting to move the output member outwardly, i.e. to the left.

For the purpose of explaining the operation of the mechanism, it will be assumed that the value inlet 6 is connected to a hydraulic fluid supply pump, the output member 8 to an actuating means, such as a master cylinder of a first servo-system, and the output 7 to a second servo system which draws its supply of fluid from the same pump but has independent actuating means.

In the unoperated, normal condition of the servo mechanism, as shown, there is no resultant hydraulic pressure acting to move the output member, irrespective of the absolute inlet pressure, and there is free communication between the inlet 6 and outlet 7 of the mechanism. If the valve is now operated by pushing the input push rod inwardly (to the left) the face valve 16 is moved closer to the seat, or against it so that flow or fluid through the piston 3 is throttled or stopped. A pressure difference is thus established across the piston, with the higher pressure acting against the effective area of the output member 8 within the valve seat 17, causing the output member to move outwardly until the force acting to move the output member and piston outwardly is balanced by the reaction exerted by the actuating means coupled to the output member. By virtue of the fact that the increased inlet pressure acts only that side of the face valve 16 remote from the seat 17, corresponding reaction is transmitted to the input member 11, in a sense to oppose closing movement of the face valve, and this provides a "feel" by which the operator can gauge the force that he is applying. Intermittent operation of the second servo system does not affect the operating characteristics of the servo mechanism, since the pressure drop across the piston is additive to any pressure rise and the control valve remains balanced until operated by the input push rod. This remains true even if there is a loss of pressure in the second system. If the second system is such that failure causes the valve outlet 7 to be effectively closed, manual operation of the valve will still be possible. The design of the piston seal 4 is such that it can act as a relief valve means to permit the flow of fluid past the piston from the outlet to the inlet. The face valve 16 then acts to transmit forces from the abutment or collar 14 on the input push rod to the valve seat 17, which constitutes an abutment on the output push rod. This mode of operation will similarly apply in the event of failure of the pumped supply.

Many variations and modifications in the constructional details of the mechanism will of course be possible. For example, in the valve illustrated, the bore 13 which receives the end of the input push rod is completely closed so as to act as an air spring, this could however be vented and/or contain a return spring. If a spring is provided it could be dimensioned so as to be fully compressed in an extreme condition so as to transmit forces from the input member to the output member in the event of hydraulic failure, thereby relieving, at least partially, the face valve from mechanical forces. Other forms of control valve could be used, but the face valve shown is extremely simple to manufacture and assemble, and readily admits of a wide range of effective areas for the designer. It will also be understood that other forms of pressure relief valve could be employed in place of the seal 4, such as a spring loaded ball valve.

One particularly advantageous form of hydraulic servo arrangement incorporating the above described mechanism is illustrated diagrammatically in FIGURE 2. By way of example the arrangement may include a first servo system for actuating power brakes of a vehicle, and a second servo system for power steering. The input member 11 is coupled to a foot operated brake pedal, or to both pedals in the case where separate pedals are provided for controlling the brakes on opposite sides of the vehicle, actuation of either or both pedals moving the input member equally. A common supply pump 31 takes fluid from a reservoir 32 and delivers to the inlet 6 of the servo valve 1. The output member of the servo valve is arranged to engage and operate the actuating member of a brake master cylinder 33, which may be mounted on or integral with the body of the servo-mechanism. The master cylinder is connected between the reservoir 32 and a brake selector valve 34 serving slave cylinders 36. The servo-valve outlet 7 is connected to a steering valve 37 in turn connected to another servo-valve (not shown) having independent actuating means, for controlling the supply of fluid to a power steering ram. The power steering system which may be of a well known conventional form, of itself forms no part of the present invention and needs no further description. However, the steering valve 37 will normally be of the open-centre type which is intermittently closed as and when the power steering facility is required. The selector valve 37 could alternatively form part of a second servo system for some other service, such as the provision of differential lock for a tractor.

From the description of the operation of the servo-mechanism given above, it will be understood that actuation of the brake system through the servo-mechanism will be unaffected by the operative condition of the steering valve 37 at the time the servo-valve is actuated.

The servo-mechanism can also be employed with advantage in an arrangement including only one servo system, say for power braking, in which case the valve outlet 7 can be connected back to the reservoir. This would enable the braking system to be operated with consistency in spite of irregular operation of the pump, and without the need for an accumulator.

I claim:

1. In a hydraulic servo motor mechanism comprising a cylinder, a piston reciprocable in the cylinder, the cylinder having a fluid inlet and a fluid outlet, one on each side of the piston, passage means to direct hydraulic fluid from said inlet through said piston, a control valve member and a co-operating valve seat to control the flow of hydraulic fluid through said passage means, and an input member connected to said valve member for moving valve member towards said seat, said passage means being arranged to transmit the fluid pressure in said inlet to one side of said valve member in a sense to move said valve member away from said seat in opposition to closing movement of said valve member, the improvement which comprises a collar mounted upon said input member and an abutment on said input member engageable with said collar, said valve seat comprising an annular valve seat formed on said piston in axial alignment with said collar, said passage means including a passage extending longitudinally through said input member and having one end in communication with said inlet and its other end in communication with a space between said piston and said valve member and within said valve seat whereby communication in between said inlet and outlet is cut off when said collar is moved axially into engagement with said valve seat.

2. A mechanism according to claim 1, wherein said input member is capable of actuating said output member in the event of hydraulic failure, and relief valve means is provided to permit such actuation in the event of said outlet becoming closed to the flow of fluid.

3. A mechanism according to claim 1, in combination with a hydraulic servo arrangement comprising a supply of hydraulic fluid under pressure connected to said valve inlet, a first hydraulic servo-system including an actuating means operated by the said output member of said valve, and a second hydraulic servo-system connected to said outlet of said servo-valve to receive fluid from said supply via said servo-valve, said second servo-system having independent actuating means, the arrangement being such that fluctuations in the supply pressure due to operation of said second system do not substantially affect operation of said first system.

References Cited

UNITED STATES PATENTS

| | | | |
|---|---|---|---|
| 2,957,311 | 10/1960 | Stelzer | 91—49 |
| 3,148,592 | 9/1964 | Schultz et al. | 91—49 |
| 3,200,713 | 8/1965 | Viersma et al. | 91—49 |

MARTIN P. SCHWADRON, *Primary Examiner.*

PAUL E. MASLOUSKY, *Examiner.*

UNITED STATES PATENT OFFICE
CERTIFICATE OF CORRECTION

Patent No. 3,327,590　　　　　　　　　　　　June 27, 1967

Brian Alan Johnson

It is certified that error appears in the above identified patent and that said Letters Patent are hereby corrected as shown below:

Column 2, line 63, after "piston" insert -- and output member --; line 64, before "output" insert -- piston 3 and that part of the --; line 65, after "member" insert -- and piston --.

Signed and sealed this 26th day of August 1969.

(SEAL)
Attest:

Edward M. Fletcher, Jr.　　　　　　　　　WILLIAM E. SCHUYLER, JR.
Attesting Officer　　　　　　　　　　　　　Commissioner of Patents